(12) United States Patent
Kijima et al.

(10) Patent No.: US 11,993,240 B2
(45) Date of Patent: May 28, 2024

(54) CONTROLLER AND CONTROL METHOD

(71) Applicant: Robert Bosch GmbH, Stuttgart (DE)

(72) Inventors: Naoto Kijima, Kanagawa (JP);
Shunsaku Ono, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/001,130

(22) PCT Filed: Jun. 11, 2021

(86) PCT No.: PCT/IB2021/055146
§ 371 (c)(1),
(2) Date: Dec. 8, 2022

(87) PCT Pub. No.: WO2021/260475
PCT Pub. Date: Dec. 30, 2021

(65) Prior Publication Data
US 2023/0211760 A1 Jul. 6, 2023

(30) Foreign Application Priority Data
Jun. 24, 2020 (JP) ................................ 2020-109815

(51) Int. Cl.
*B60T 8/00* (2006.01)
*B60T 8/17* (2006.01)
(Continued)

(52) U.S. Cl.
CPC .......... *B60T 8/1755* (2013.01); *B60T 8/1706* (2013.01); *B62J 45/20* (2020.02); *B60T 2230/02* (2013.01)

(58) Field of Classification Search
CPC ............ B60Y 2200/12; B60Y 2200/91; B60Y 2300/18175; B60Y 2300/60;
(Continued)

(56) References Cited

U.S. PATENT DOCUMENTS 7,469,975 B2 * 12/2008 Wagner ................. B60T 8/1706
303/191
8,689,920 B2 * 4/2014 Matsuda ............... B60T 8/1706
180/197
(Continued)

FOREIGN PATENT DOCUMENTS

DE 102009046226 A1 5/2011
DE 102010031140 A1 1/2012
(Continued)

OTHER PUBLICATIONS

International Search Report and Written Opinion for Application No. PCT/IB2021/055146 dated Oct. 11, 2021 (10 pages).

*Primary Examiner* — Truc M Do
(74) *Attorney, Agent, or Firm* — Michael Best & Friedrich LLP

(57) ABSTRACT

The present invention obtains a controller and a control method capable of simultaneously achieving freedom of driving and safety of a lean vehicle.
In a controller (60) and the control method according to the present invention, a control section of the controller (60) can execute anti-lock braking operation for suppressing locking of a rear wheel (4) by increasing/reducing a braking force or drive power of the rear wheel (4) of a lean vehicle (100) and thereby controlling a slip degree of the rear wheel (4) to a slip degree target, and in the case where a slide request, which is a request by a rider to make the lean vehicle (100) slide, is present, implements a slide control mode in which the anti-lock braking operation is performed by setting the slip degree target to be higher than that of a case where the slide request is absent.

9 Claims, 5 Drawing Sheets

(51) Int. Cl.
*B60T 8/1755* (2006.01)
*B62J 45/20* (2020.01)

(58) Field of Classification Search
CPC ............ B60W 2520/26; B60W 10/06; B60W 2510/0638; B60W 2520/10; B60W 2520/28; B60W 10/10; B60W 2510/1005; B60W 2710/0605; B60W 2710/0666; B60W 30/02; B60W 40/064; B60W 40/112; B60W 50/14; B60W 10/02; B60W 10/04; B60W 10/08; B60W 10/184; B60W 20/00; B60W 20/15; B60W 2300/36; B60W 2300/367; B60W 2510/0208; B60W 2510/0652; B60W 2520/06; B60W 2520/12; B60W 2520/18; B60W 2520/20; B60W 2530/20; B60W 2540/10; B60W 2540/18; B60W 2710/0616; B60W 2710/083; B60W 2710/105; B60W 30/00; B60W 30/04; B60W 30/045; B60W 30/18109; B60W 30/18172; B60W 40/114; B60W 50/082

See application file for complete search history.

(56) References Cited

U.S. PATENT DOCUMENTS

| | | | | |
|---|---|---|---|---|
| 2008/0105479 | A1* | 5/2008 | Nishiike | B60T 8/175 701/84 |
| 2009/0326777 | A1* | 12/2009 | Oshima | B60T 8/175 701/84 |
| 2017/0101081 | A1* | 4/2017 | Meier | B60T 8/1766 |
| 2019/0023264 | A1* | 1/2019 | Mizutani | B60T 8/1755 |

FOREIGN PATENT DOCUMENTS

| | | |
|---|---|---|
| DE | 102013208007 A1 | 11/2014 |
| JP | H0740824 A | 2/1995 |
| JP | 2006015790 A | 1/2006 |
| JP | 2018024324 A | 2/2018 |
| JP | 2020093558 A | 6/2020 |
| WO | 2014009033 A1 | 1/2014 |

* cited by examiner

[FIG. 1]
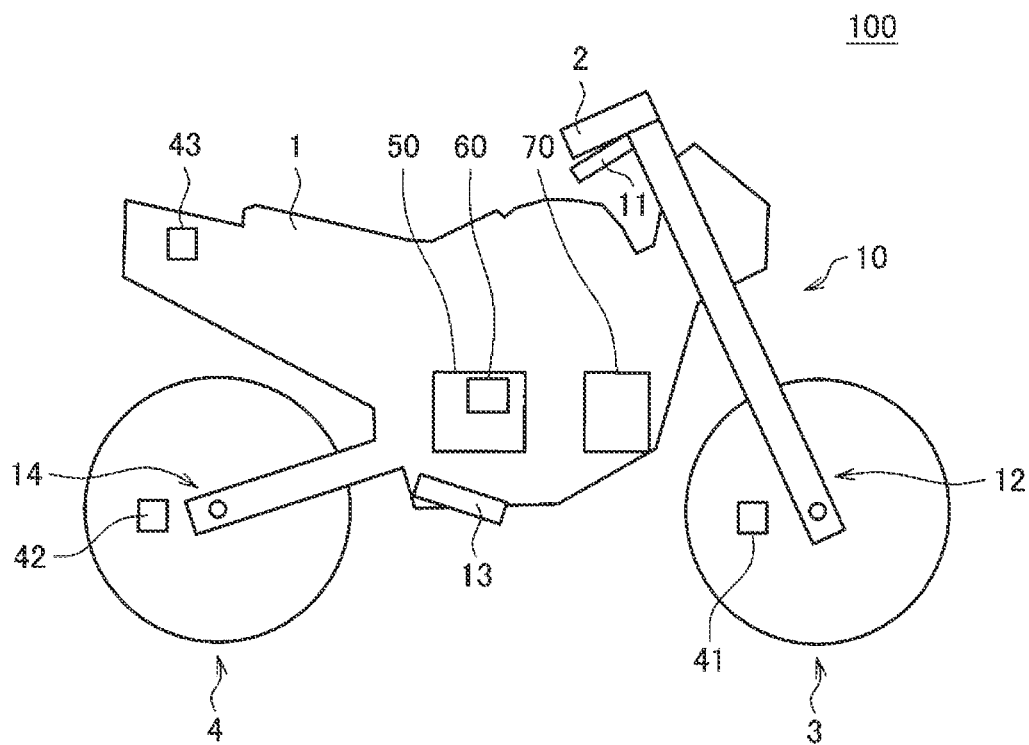

[FIG. 2]
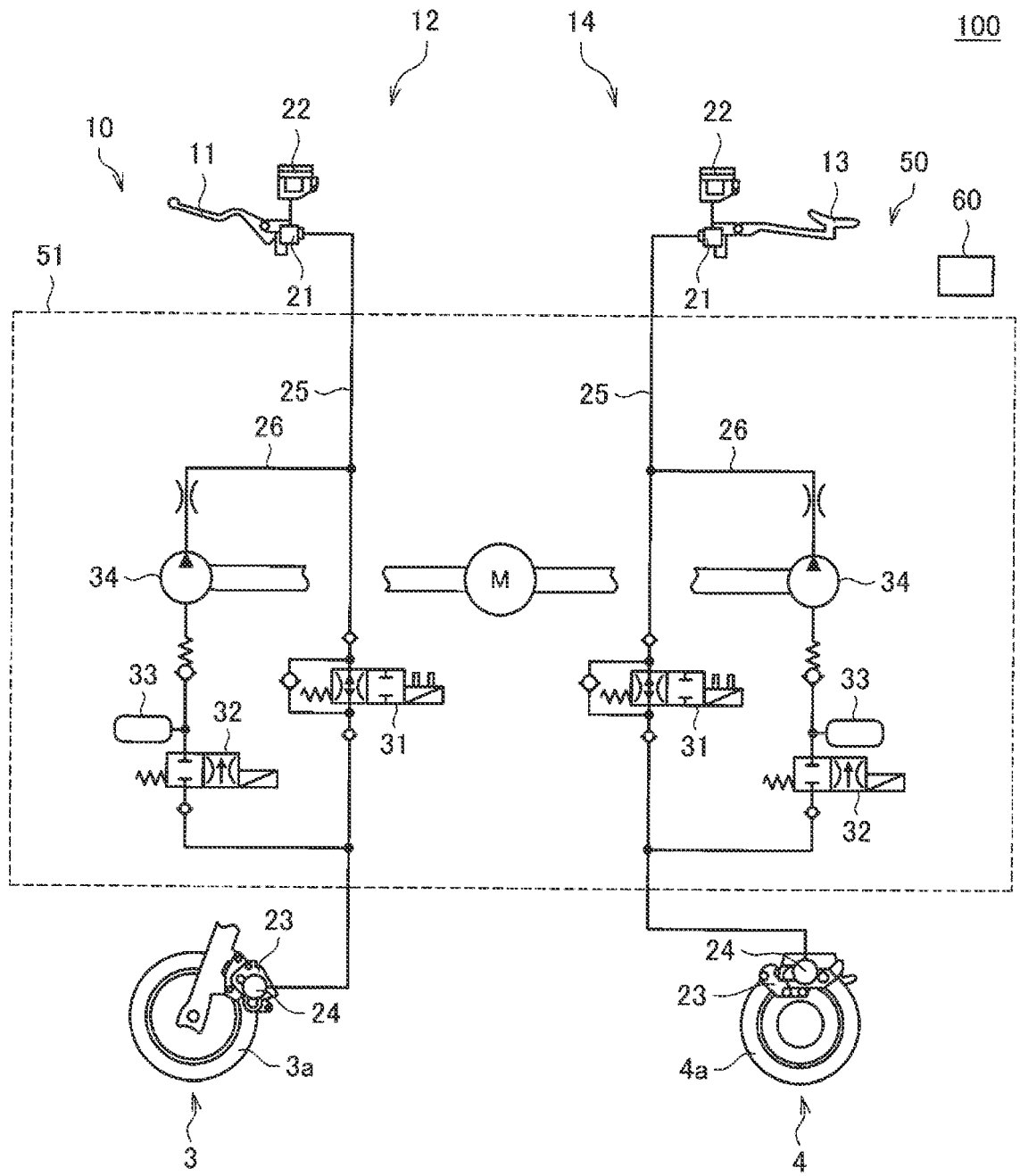

[FIG. 3]
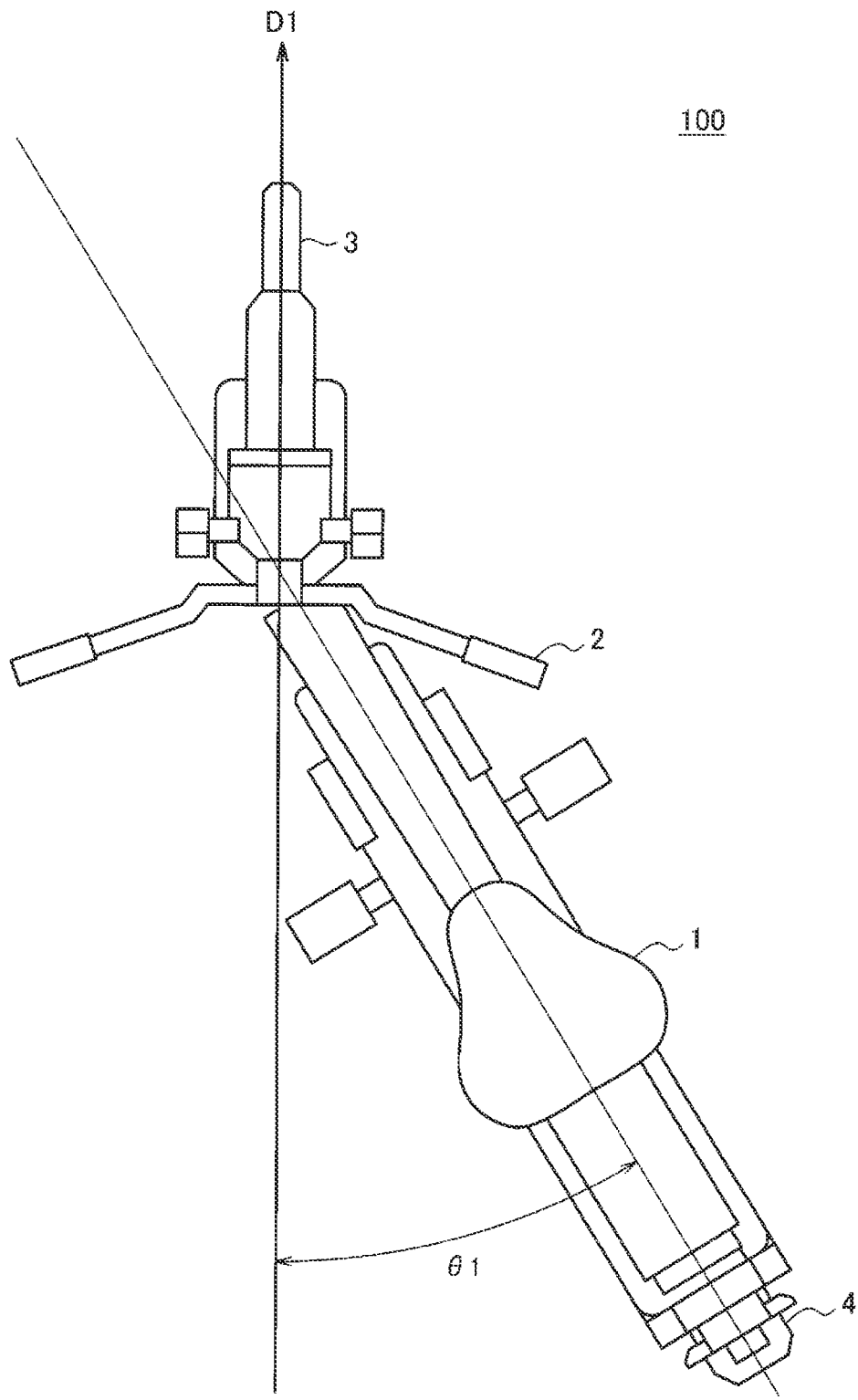

[FIG. 4]
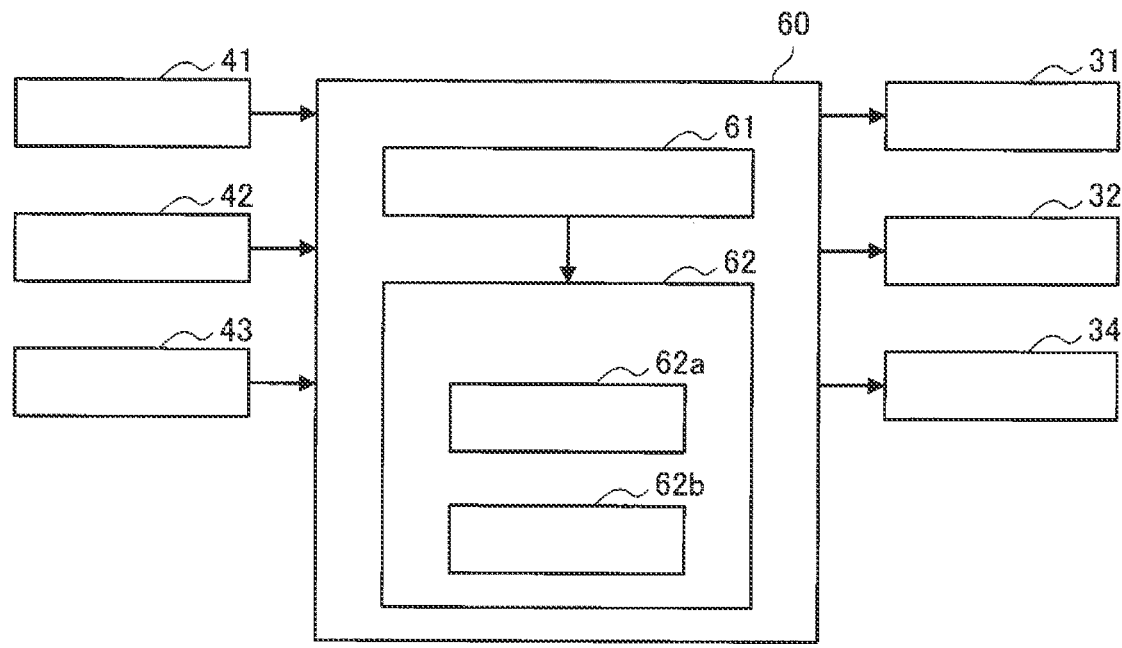
[FIG. 5]
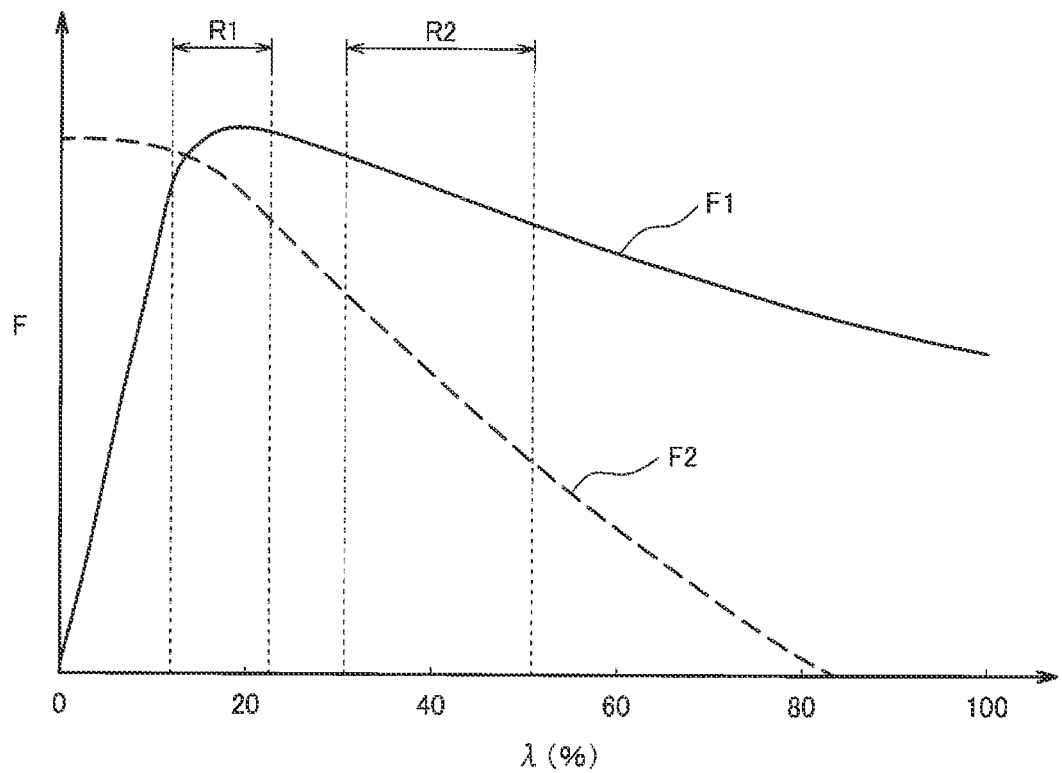

[FIG. 6]
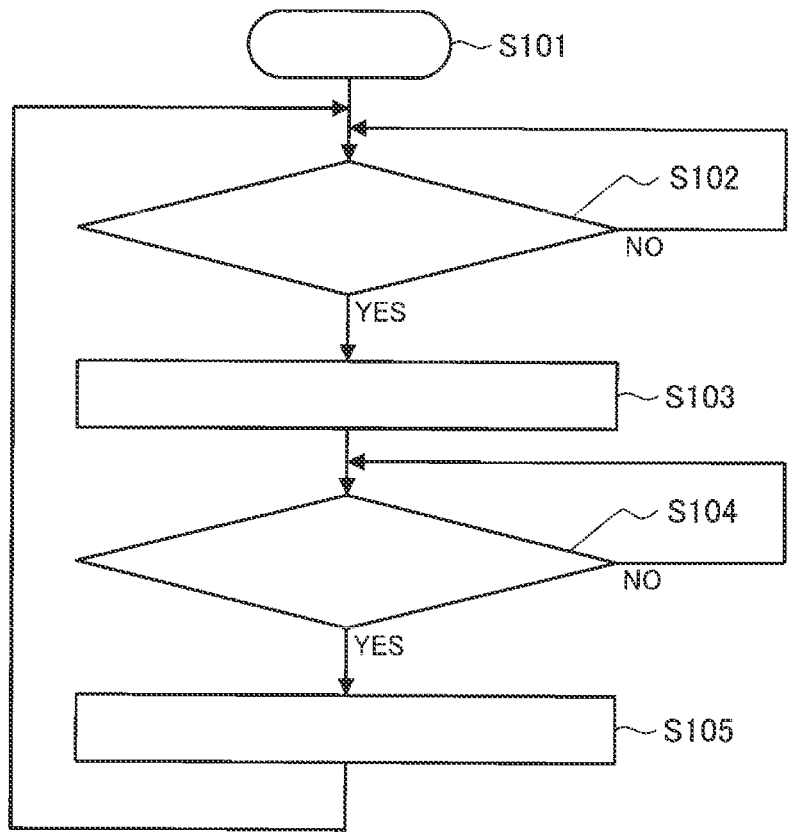
[FIG. 7]
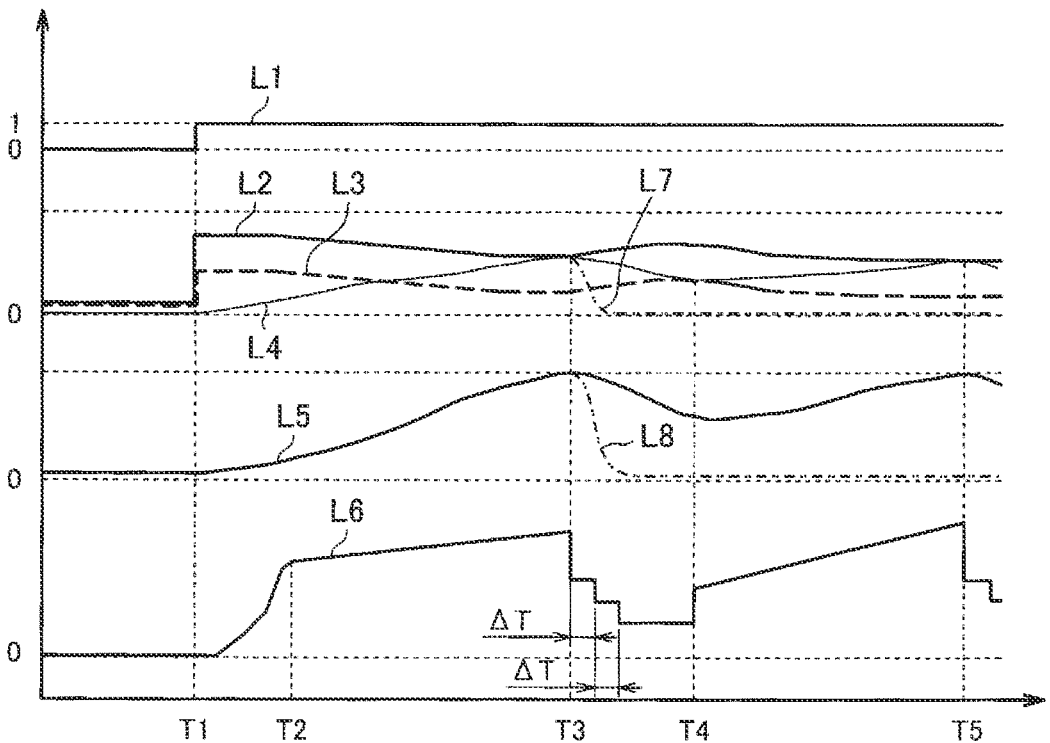

CONTROLLER AND CONTROL METHOD

BACKGROUND OF THE INVENTION

The present disclosure relates to a controller and a control method capable of simultaneously achieving freedom of driving and safety of a lean vehicle.

Conventionally, as control related to behavior of a lean vehicle (that is, a vehicle traveling in a state of being tilted in a turning direction during turning), the following controller is available. The controller can perform anti-lock braking operation for suppressing locking of a wheel by increasing/reducing a braking force or drive power of a wheel of the lean vehicle and thereby controlling a slip degree of the wheel to a slip degree target. For example, in JP-A-2018-024324, a technique related to the anti-lock braking operation, which is by increasing/reducing the braking force of the wheel, is disclosed.

SUMMARY OF THE INVENTION

By the way, one of travel methods of the lean vehicle is slide travel in which the lean vehicle slides (that is, a vehicle body slips sideways). In the slide travel, a rear wheel has to slip sideways. Thus, a lateral grip force of a tire of the rear wheel has to be small to some extent. Of the grip force of the tire (that is, a friction force generated between the tire and a road surface), the lateral grip force is a component that is perpendicular to an advancing direction of the tire, and is reduced as the slip degree of the wheel is increased. Here, when the anti-lock braking operation is performed, the slip degree is controlled to the slip degree target. As a result, the lateral grip force of the tire of the rear wheel becomes less likely to be reduced. In this way, while safety is improved, it becomes difficult to make the slide travel as intended by a rider, which possibly reduces a degree of freedom of driving.

The present invention has been made with the above-described problem as the background and therefore obtains a controller and a control method capable of simultaneously achieving freedom of driving and safety of a lean vehicle.

A controller according to the present invention is a controller that controls behavior of a lean vehicle, and includes a control section capable of performing anti-lock braking operation for suppressing locking of a rear wheel by increasing/reducing a braking force or drive power of the rear wheel of the lean vehicle and thereby controlling a slip degree of the rear wheel to a slip degree target. In the case where a slide request, which is a request by a rider to make the lean vehicle slide, is present, the control section implements a slide control mode in which the anti-lock braking operation is performed by setting the slip degree target to be higher than that of a case where the slide request is absent.

A control method according to the present invention is a control method for behavior of a lean vehicle. A control section of a controller can perform anti-lock braking operation for suppressing locking of a rear wheel by increasing/reducing a braking force or drive power of the rear wheel of the lean vehicle and thereby controlling a slip degree of the rear wheel to a slip degree target. In the case where a slide request, which is a request by a rider to make the lean vehicle slide, is present, the control section implements a slide control mode in which the anti-lock braking operation is performed by setting the slip degree target to be higher than that of a case where the slide request is absent.

In the controller and the control method according to the present invention, the control section of the controller can perform the anti-lock braking operation for suppressing locking of the rear wheel by increasing/reducing the braking force or the drive power of the rear wheel of the lean vehicle and thereby controlling the slip degree of the rear wheel to the slip degree target. In the case where the slide request, which is the request by the rider to make the lean vehicle slide, is present, the control section implements the slide control mode, in which the anti-lock braking operation is performed by setting the slip degree target to be higher than that of the case where the slide request is absent. As a result, it is possible to suppress a lateral grip force of a tire of the rear wheel from being excessively increased by the anti-lock braking operation during slide travel. Thus, it is possible to make the slide travel as intended by the rider. Therefore, it is possible to simultaneously achieve freedom of driving and safety of the lean vehicle.

BRIEF DESCRIPTION OF THE DRAWINGS

FIG. 1 is a schematic view illustrating an outline configuration of a lean vehicle according to an embodiment of the present invention.

FIG. 2 is a schematic view illustrating an outline configuration of a brake system according to the embodiment of the present invention.

FIG. 3 is a view for illustrating a slide angle of the lean vehicle according to the embodiment of the present invention.

FIG. 4 is a block diagram illustrating an example of a functional configuration of a controller according to the embodiment of the present invention.

FIG. 5 is a schematic graph illustrating an exemplary relationship between a slip rate and a grip force of a wheel of the lean vehicle according to the embodiment of the present invention.

FIG. 6 is a flowchart illustrating an example of a processing procedure that is related to switching between a normal mode and a slide control mode and that is executed by the controller according to the embodiment of the present invention.

FIG. 7 is a schematic chart illustrating changes in various state amounts during travel of the lean vehicle according to the embodiment of the present invention.

DETAILED DESCRIPTION

A description will hereinafter be made on a controller according to the present invention with reference to the drawings.

The following description will be made on the controller that is used for a two-wheeled motorcycle (see a lean vehicle 100 in FIG. 1). However, a vehicle as a control target of the controller according to the present invention only needs to be a lean vehicle that travels in a state of being tilted in a turning direction during a turn, and may be a three-wheeled motorcycle or the like, for example.

In addition, the following description will be made on a case where each of a front-wheel brake mechanism and a rear-wheel brake mechanism is provided in one unit (see a front-wheel brake mechanism 12 and a rear-wheel brake mechanism 14 in FIG. 2). However, at least one of the front-wheel brake mechanism and the rear-wheel brake mechanism may be provided in multiple units.

Furthermore, the following description will be made on a case where an engine (see an engine 70 in FIG. 1) is mounted as a drive source capable of outputting power for driving a wheel of the lean vehicle. However, as a drive source of the lean vehicle, a drive source other than the engine (for example, a motor) may be mounted, or a plurality of drive sources may be mounted.

Moreover, the following description will be made on a case where anti-lock braking operation is performed to suppress locking of a rear wheel by increasing/reducing a braking force of the rear wheel. However, as will be described below, the anti-lock braking operation may be performed to suppress locking of the rear wheel by increasing/reducing drive power of the rear wheel, or the anti-lock braking operation may be performed to suppress locking of the rear wheel by increasing/reducing the braking force of the rear wheel and increasing/reducing the drive power of the rear wheel.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

Configuration of Lean Vehicle

A description will be made on a configuration of the lean vehicle 100 according to the embodiment of the present invention with reference to FIG. 1 to FIG. 4.

FIG. 1 is a schematic view illustrating an outline configuration of the lean vehicle 100. FIG. 2 is a schematic view illustrating an outline configuration of a brake system 10. FIG. 3 is a view for illustrating a slide angle of the lean vehicle 100. FIG. 4 is a block diagram illustrating an example of a functional configuration of a controller 60.

The lean vehicle 100 is a two-wheeled motorcycle that corresponds to an example of the lean vehicle according to the present invention. As illustrated in FIG. 1, the lean vehicle 100 includes: a trunk 1; a handlebar 2 that is held by the trunk 1 in a freely turnable manner; a front wheel 3 that is held by the trunk 1 in a freely turnable manner with the handlebar 2; a rear wheel 4 that is held by the trunk 1 in a freely rotatable manner; the brake system 10; a front-wheel rotational frequency sensor 41; a rear-wheel rotational frequency sensor 42; an inertial measurement unit (IMU) 43; a hydraulic pressure control unit 50 provided to the brake system 10; the controller (ECU) 60 provided to the hydraulic pressure control unit 50; and the engine 70.

As illustrated in FIG. 1 and FIG. 2, the brake system 10 includes: a first brake operation section 11; the front-wheel brake mechanism 12 that brakes the front wheel 3 in an interlocking manner with at least the first brake operation section 11; a second brake operation section 13; and the rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by a rider's hand. The first brake operation section 11 is a brake lever, for example. The second brake operation section 13 is provided to a lower portion of the trunk 1 and is operated by the rider's foot. The second brake operation section 13 is a brake pedal, for example. However, like a brake operation section of a scooter or the like, each of the first brake operation section 11 and the second brake operation section 13 may be a brake lever that is operated by the rider's hand.

Each of the front-wheel brake mechanism 12 and the rear-wheel brake mechanism 14 includes: a master cylinder 21 that includes a piston (not illustrated); a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; and a secondary channel 26 through which the brake fluid in the wheel cylinder 24 is released.

An inlet valve (EV) 31 is provided in the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side.

The inlet valve 31 is an electromagnetic valve that is opened in an unenergized state and closed in an energized state, for example. The outlet valve 32 is an electromagnetic valve that is closed in the unenergized state and opened in the energized state, for example.

The hydraulic pressure control unit 50 includes: components such as the inlet valve 31, the outlet valve 32, the accumulator 33, and the pump 34 used to control a brake hydraulic pressure; a base body 51 in which those components are provided and channels constituting the primary channel 25 and the secondary channel 26 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

During a normal time (that is, when the braking force corresponding to a brake operation by the rider is generated on the wheel), the controller 60 opens the inlet valves 31 and closes the outlet valves 32. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The engine 70 corresponds to an example of a drive source for the lean vehicle 100, and can output power for driving a drive wheel (more specifically, the rear wheel 4). For example, the engine 70 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 70, and an intake air amount for the combustion chamber varies according to a throttle opening amount as an opening degree of the throttle valve.

The front-wheel rotational frequency sensor 41 is a rotational frequency sensor that detects a rotational frequency of the front wheel 3 (for example, a rotational frequency of the front wheel 3 per unit time [rpm], a travel distance per unit time [km/h], or the like), and outputs a detection result. The front-wheel rotational frequency sensor 41 may detect another physical quantity that can substantially be converted to the rotational frequency of the front wheel 3. The front-wheel rotational frequency sensor 41 is provided to the front wheel 3.

The rear-wheel rotational frequency sensor 42 is a rotational frequency sensor that detects a rotational frequency of the rear wheel 4 (for example, the rotational frequency of the rear wheel 4 per unit time [rpm], a travel distance per unit time [km/h], or the like), and outputs a detection result. The rear-wheel rotational frequency sensor 42 may detect another physical quantity that can substantially be converted to the rotational frequency of the rear wheel 4. The rear-wheel rotational frequency sensor 42 is provided to the rear wheel 4.

The IMU 43 includes a three-axis gyroscope sensor and a three-directional acceleration sensor, and detects a posture of the lean vehicle 100. The IMU 43 is provided to the trunk 1, for example.

More specifically, the IMU 43 detects the slide angle of the lean vehicle 100, and outputs a detection result. The IMU 43 may detect another physical quantity that can substantially be converted to the slide angle of the lean vehicle 100. The slide angle corresponds to an angle θ1 illustrated in FIG. 3 (that is, an angle that represents an inclination of a vehicle body (more specifically, the trunk 1) with respect to an advancing direction D1 of the lean vehicle 100). When the lean vehicle 100 slides and turns, the vehicle body slips sideways, and the slide angle (the angle θ1 in FIG. 3) is thereby increased.

FIG. 3 illustrates an example in which the advancing direction D1 matches an orientation of the front wheel 3. However, there is a possibility that the advancing direction D1 and the orientation of the front wheel 3 do not match. For example, the IMU 43 identifies the advancing direction D1 of the lean vehicle 100 and the posture of the lean vehicle 100 on the basis of the detection result of each of the sensors in the IMU 43 and thus can detect the slide angle of the lean vehicle 100.

The IMU 43 also detects a lean angle of the lean vehicle 100, and outputs a detection result. The IMU 43 may detect another physical quantity that can substantially be converted to the lean angle of the lean vehicle 100. The lean angle corresponds to an angle that represents an inclination in a rolling direction of the vehicle body (more specifically, the trunk 1) of the lean vehicle 100 with respect to an upper vertical direction.

The controller 60 controls behavior of the lean vehicle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 4, the controller 60 includes an acquisition section 61 and a control section 62, for example.

The acquisition section 61 acquires information from each of the devices mounted to the lean vehicle 100, and outputs the acquired information to the control section 62. For example, the acquisition section 61 acquires information from the front-wheel rotational frequency sensor 41, the rear-wheel rotational frequency sensor 42, and the IMU 43.

In order to control the behavior of the lean vehicle 100, the control section 62 controls the braking force generated on the lean vehicle 100. The control section 62 includes a determination section 62a and a brake control section 62b, for example.

The determination section 62a makes various determinations. The determination results by the determination section 62a are used for processing that is executed by the brake control section 62b. In particular, the determination section 62a determines presence or absence of a slide request by the rider. The slide request is the rider's request to make the lean vehicle 100 slide.

The brake control section 62b controls the operation of each of the components in the hydraulic pressure control unit 50 of the brake system 10, so as to control the braking force generated on each of the wheels of the lean vehicle 100.

As described above, during the normal time, the brake control section 62b controls the operation of each of the components in the hydraulic pressure control unit 50 such that the braking force corresponding to the brake operation by the rider is generated on each of the wheels.

Here, the brake control section 62b controls a slip degree of the wheel to a slip degree target by increasing/reducing the braking force of the wheel, and thereby executes anti-lock braking operation to suppress locking of the wheel.

The slip degree is an index indicating a degree of slippage of the wheel on a road surface. For example, a slip rate that is acquired by dividing a difference between a vehicle speed and the rotational frequency by the vehicle speed is used as the slip degree. For example, the brake control section 62b identifies the vehicle speed of the lean vehicle 100 (that is, a speed of the vehicle body) on the basis of the rotational frequencies of the front wheel 3 and the rear wheel 4, and calculates the slip rate of each of the wheels on the basis of a comparison result between respective one of the rotational frequencies and the vehicle speed. As the slip degree, a parameter other than the slip rate (for example, another physical quantity that can substantially be converted to the slip rate) may be used.

For example, the slip degree target is a numerical range having an upper limit value and a lower limit value. A description will hereinafter be made on an example in which the slip degree target falls within the numerical range.

However, the slip degree target may simply be a numerical value instead of the numerical range.

In the case where at least one of the wheels is locked or possibly locked, the brake control section 62b initiates the anti-lock braking operation. In the anti-lock braking operation, the braking force of the wheel is adjusted to such a braking force with which locking of the wheel can be avoided. Here, before the initiation of the anti-lock braking operation, the brake control section 62b may change a positive slope of the braking force of the wheel to be smaller than the positive slope in a case where the braking force of the wheel only depends on a brake operation amount by the rider. For example, the brake control section 62b opens/closes the inlet valve 31 through duty control, pulse control, a combination thereof, or the like, so as to be able to control the positive slope of the braking force of the wheel to a desired slope.

More specifically, in the case where the slip degree of the wheel is increased and exceeds the upper limit value of the slip degree target of the wheel (that is, a pressure-reduction initiation threshold), the brake control section 62b initiates the anti-lock braking operation. When the anti-lock braking operation is initiated, the brake control section 62b first reduces the braking force of the wheel so as to reduce the slip degree of the wheel. More specifically, the brake control section 62b brings a state where the inlet valve 31 is closed and the outlet valve 32 is opened, and drives the pump 34 in such a state. In this way, the brake control section 62b reduces the hydraulic pressure of the brake fluid in the wheel cylinder 24 and thereby reduces the braking force to be generated on the wheel.

Then, the brake control section 62b closes both of the inlet valve 31 and the outlet valve 32, thereby keeps the hydraulic pressure of the brake fluid in the wheel cylinder 24, and keeps the braking force to be generated on the wheel. Thereafter, in the case where the slip degree of the wheel is reduced and falls below the lower limit value of the slip degree target of the wheel (that is, a pressure-boosting initiation threshold), the brake control section 62b increases the braking force of the wheel and thereby increases the slip degree of the wheel. More specifically, the brake control section 62b opens the inlet valve 31 and closes the outlet valve 32, so as to increase the hydraulic pressure of the brake fluid in the wheel cylinder 24 and increase the braking force generated on the wheel.

Thereafter, in the case where the slip degree of the wheel is increased and exceeds the upper limit value of the slip degree target of the wheel again, the control for reducing the slip degree of the wheel by reducing the braking force of the wheel is executed again. When the braking force of the wheel is reduced, just as described, the control for reducing the slip degree of the wheel, the control for keeping the braking force of the wheel, and the control for increasing the slip degree of the wheel by increasing the braking force of the wheel are repeatedly executed. As described above, in the anti-lock braking operation, in the case where the slip degree of the wheel is between the upper limit value and the lower limit value of the slip degree target (that is, between the pressure-reduction initiation threshold and the pressure-boosting initiation threshold), the brake control section 62b may keep the slip degree of the wheel.

The brake control section 62b can separately control the braking force generated on the front wheel 3 and the braking force generated on the rear wheel 4 by separately controlling the operation of the front-wheel brake mechanism 12 and the rear-wheel brake mechanism 14.

As described above, in the controller 60, the control section 62 can perform the anti-lock braking operation for suppressing locking of the wheel by increasing/reducing the braking force or the drive power of the wheel of the lean vehicle 100 and thereby controlling the slip degree of the wheel to the slip degree target. Here, the control section 62 executes the anti-lock braking operation for the rear wheel 4 (more specifically, operation to control the slip degree of the rear wheel 4 to the slip degree target by increasing/reducing the braking force of the rear wheel 4 and thereby suppress locking of the rear wheel 4) on the basis of the presence or the absence of the slide request that is the rider's request to make the lean vehicle 100 slide. In this way, it is possible to simultaneously achieve freedom of driving and safety of the lean vehicle 100. A detailed description will be made below on processing related to such anti-lock braking operation for the rear wheel 4 that is executed by the controller 60.

Operation of Controller

A description will be made on operation of the controller 60 according to the embodiment of the present invention with reference to FIG. 5 to FIG. 7.

As described above, in this embodiment, the control section 62 performs the anti-lock braking operation for the rear wheel 4 on the basis of the presence or the absence of the slide request by the rider. More specifically, in the case where the slide request by the rider is present, the control section 62 implements a slide control mode in which the anti-lock braking operation for the rear wheel 4 is performed in a state where the slip degree target of the rear wheel 4 is set to be higher than that of a case where the slide request is absent.

Hereinafter, a mode in which the slide control mode is not implemented will be referred to as a normal mode. That is, in the normal mode, the anti-lock braking operation for the rear wheel 4 is performed in a state where the slip degree target of the rear wheel 4 is lower than that in the slide control mode.

For example, the control section 62 sets the lower limit value of the slip degree target for the rear wheel 4 in the anti-lock braking operation for the rear wheel 4, which is performed in the slide control mode, to be higher than the upper limit value of the slip degree target of the rear wheel 4 in the anti-lock braking operation for the rear wheel 4, which is performed in the normal mode. Thus, in the slide control mode, the slip degree of the rear wheel 4 can be higher than that in the normal mode.

The processing to increase the slip degree target of the rear wheel 4 is not limited to the above example (that is, processing to change the slip degree target of the rear wheel 4 such that the lower limit value after the change of the slip degree target of the rear wheel 4 is higher than the upper limit value before the change). For example, processing to increase an average value of the slip degree target of the rear wheel 4 before/after the change of the slip degree target of the rear wheel 4 can be included in the processing to increase the slip degree target of the rear wheel 4. In this case, the lower limit value after the change of the slip degree target of the rear wheel 4 may be lower than the upper limit value before the change.

FIG. 5 is a schematic graph illustrating an exemplary relationship between a slip rate λ and a grip force F of the wheel of the lean vehicle 100. In FIG. 5, a horizontal axis represents the slip rate λ and a vertical axis represents the grip force F. The grip force F of a tire (that is, a friction force generated between the tire and the road surface) is decomposed into a vertical grip force F1 and a lateral grip force F2. Of the grip force F of the tire, the vertical grip force F1 is a component that is parallel to an advancing direction of the tire. Of the grip force F of the tire, the lateral grip force F2 is a component that is perpendicular to the advancing direction of the tire. As illustrated in FIG. 5, in general, the vertical grip force F1 is increased in a process in which the slip rate λ is increased from 0% to approximately 20%, and thereafter the vertical grip force F1 is reduced along with the increase in the slip rate λ. In addition, in general, the lateral grip force F2 is reduced as the slip rate λ is increased. In slide travel, the rear wheel 4 has to slip sideways. Thus, it is requested for a tire of the rear wheel 4 to have a lateral grip force F2 that is small to some extent.

A range R1 of the slip rate λ, in FIG. 5 corresponds to an example of the slip degree target of the rear wheel 4 in the anti-lock braking operation for the rear wheel 4, which is performed in the normal mode. Meanwhile, a range R2 of the slip rate λ in FIG. 5 corresponds to an example of the slip degree target of the rear wheel 4 in the anti-lock braking operation for the rear wheel 4, which is performed in the slide control mode. A lower limit value of the range R2, which corresponds to the slide control mode, is higher than an upper limit value of the range R1, which corresponds to the normal mode. Thus, in the slide control mode, the slip degree of the rear wheel 4 is permitted to be higher than that in the normal mode.

As described above, according to this embodiment, in the case where the slide request by the rider is present, the slide control mode is implemented, and the state where the slip degree of the rear wheel 4 is high is permitted. Accordingly, it is possible to suppress the excessive increase in the lateral grip force F2 of the tire of the rear wheel 4 by the anti-lock braking operation during the slide travel. Thus, it is possible to make the slide travel as intended by the rider. Therefore, it is possible to simultaneously achieve the freedom of driving and the safety of the lean vehicle 100.

FIG. 6 is a flowchart illustrating an example of a processing procedure that is related to switching between the normal mode and the slide control mode and that is executed by the controller 60. A control flow illustrated in FIG. 6 is initiated in a situation where the normal mode is implemented. More specifically, the control flow illustrated in FIG. 6 is executed by the control section 62 of the controller 60. However, any of various other processing may be executed during the control flow illustrated in FIG. 6.

Step S101 in FIG. 6 corresponds to initiation of the control flow illustrated in FIG. 6.

When the control flow illustrated in FIG. 6 is initiated, in step S102, the determination section 62a determines whether the slide request by the rider is present. If it is determined that the slide request by the rider is present (step S102/YES), the processing proceeds to step S103, and the brake control section 62b initiates the slide control mode and increases the slip degree target of the rear wheel 4. A detailed description on the processing in the slide control mode will be made below with reference to FIG. 7. On the other hand, if it is determined that the slide request by the rider is absent (step S102/NO), the processing in step S102 is repeated.

In the determination processing in step S102, for example, the determination section 62a may determine the presence or the absence of the slide request on the basis of driving operation information of the rider. The driving operation information is information on a driving operation by the rider and includes various parameters, each of which can vary in an interlocking manner with the driving operation.

For example, the driving operation information can include deceleration of the lean vehicle 100, the lean angle of the lean vehicle 100, lateral acceleration of the lean vehicle 100, a yaw rate of the lean vehicle 100, a vehicle speed of the lean vehicle 100, a change rate of each thereof, or the like.

For example, the determination section 62a may determine that the slide request by the rider is present in the case where the deceleration of the lean vehicle 100 is greater than reference deceleration and the lean angle of the lean vehicle 100 is larger than a reference lean angle. In addition, the determination section 62a may determine that the slide request by the rider is present, for example, in the case where a condition that the vehicle speed of the lean vehicle 100 is higher than a reference speed is satisfied, in addition to the above condition. Each of the reference deceleration, the reference lean angle, and the reference speed is set to a value with which it is possible to appropriately determine whether the rider has the slide request.

The determination on the presence or the absence of the slide request based on the driving operation information is not particularly limited to the above example. For example, as described above, plural types of the driving operation information may be used, or the single type of the driving operation information may be used. In addition, a combination of the driving operation information, which is used for the determination on the presence or the absence of the slide request, may differ from that in the above example. Furthermore, for the determination on the presence or the absence of the slide request based on the driving operation information, the lean angle may be used as described above, and instead of the lean angle in such a case, the lateral acceleration or the yaw rate may be used. The controller 60 can acquire the lateral acceleration or the yaw rate by using a sensor capable of detecting the lateral acceleration or a sensor capable of detecting the yaw rate.

In the determination processing in step S102, for example, the determination section 62a may determine the presence or the absence of the slide request on the basis of setting information by the rider. The setting information is information on a setting operation by the rider using an input device (for example, a button, a touchscreen, a voice recognition device, or the like) provided to the lean vehicle 100.

For example, in the case where the lean vehicle 100 is provided with the input device for selecting and setting the mode to be implemented from the normal mode and the slide control mode, information on an operation of the input device by the rider can be used as the setting information. In such a case, the determination section 62a may determine that the slide request by the rider is present in the case where the setting information is information indicating that the slide control mode is selected.

If it is determined YES in step S102, following step S103, in step S104, the determination section 62a determines whether a termination condition of the slide control mode is satisfied. If it is determined that the termination condition of the slide control mode is satisfied (step S104/YES), the processing proceeds to step S105, and the brake control section 62b terminates the slide control mode and returns the slip degree target of the rear wheel 4 to the original amount. Then, the processing returns to step S102. On the other hand, if it is determined that the termination condition of the slide control mode is not satisfied (step S104/NO), the processing in step S104 is repeated.

As the termination condition of the determination processing in step S104, such a condition that the slide request by the rider is no longer present can be used, for example. For example, in the case where the deceleration of the lean vehicle 100 falls below the reference deceleration, in the case where the vehicle speed of the lean vehicle 100 falls below the reference speed, or the like, the determination section 62a may determine that the slide request is no longer present, and may determine that the termination condition of the slide control mode is satisfied.

A detailed description will hereinafter be made on the processing in the slide control mode with reference to FIG. 7.

FIG. 7 is a schematic chart illustrating changes in various state amounts during the travel of the lean vehicle 100. In FIG. 7, a horizontal axis is a time axis, and a vertical axis represents a value of each of the various state amounts. As the various state amounts, FIG. 7 illustrates a slide control mode flag L1, an upper limit value L2 of the slip degree target (that is, the pressure-reduction initiation threshold), a lower limit value L3 of the slip degree target (that is, the pressure-boosting initiation threshold), a slip degree L4 of the rear wheel 4, a slide angle L5, and a braking force L6 of the rear wheel 4. The slide control mode flag L1 is a flag that indicates whether the normal mode or the slide control mode is implemented. When the slide control mode flag L1 is 0, the normal mode is implemented. When the slide control mode flag L1 is 1, the slide control mode is implemented.

In an example illustrated in FIG. 7, prior to a time point T1, the lean vehicle 100 travels straight. At this time, the slide control mode flag L1 is 0, and thus the normal mode is implemented (that is, the slide control mode is not implemented). Then, at the time point T1, it is determined that the slide request by the rider is present, the slide control mode flag L1 is switched to 1, and the slide control mode is initiated. Thus, at the time point T1 onward, the slip degree target of the rear wheel 4 (that is, a range between the upper limit value L2 and the lower limit value L3) is increased in comparison with that prior to the time point T1. More specifically, at the time point T1 onward, the lower limit value L3 of the slip degree target of the rear wheel 4 is larger than the upper limit value L2 of the slip degree target of the rear wheel 4 prior to the time point T1.

Here, at the time point T1 onward (that is, when the slide control mode is implemented), a difference between the upper limit value L2 and the lower limit value L3 of the slip degree target of the rear wheel 4 is larger than that prior to the time point T1 (that is, when the slide control mode is not implemented). As will be described below, during the anti-lock braking operation for the rear wheel 4, the braking force L6 of the rear wheel 4 is repeatedly increased/reduced. A frequency of the repeated increase/reduction of the braking force L6 of the rear wheel 4 in the anti-lock braking operation is reduced as the difference between the upper limit value L2 and the lower limit value L3 of the slip degree target of the rear wheel 4 is increased. Accordingly, as described above, the control section 62 changes the difference between the upper limit value L2 and the lower limit value L3 of the slip degree target of the rear wheel 4 between the time when the slide control mode is implemented and the time when the slide control mode is not implemented. In this way, it is possible to optimize the frequency of the repeated increase/reduction of the braking force L6 of the rear wheel 4 in the anti-lock braking operation for the rear wheel 4, which is performed in the slide control mode.

Here, the magnitude relationship of the difference between the upper limit value L2 and the lower limit value L3 of the slip degree target of the rear wheel 4 between the time when the slide control mode is implemented and the time when the slide control mode is not implemented is not limited to the example illustrated in FIG. 7. For example, when the slide control mode is implemented, the control section 62 may reduce the difference between the upper limit value L2 and the lower limit value L3 of the slip degree target of the rear wheel 4 to be smaller than that at the time when the slide control mode is not implemented, or may set such a difference to be equal to that at the time when the slide control mode is not implemented.

In the example illustrated in FIG. 7, at the time point T1 onward, the rider slides and turns the lean vehicle 100 while performing the brake operation relatively strongly. Thus, at a time point T2 onward, the slip degree L4 of the rear wheel 4, the slide angle L5, and the braking force L6 of the rear wheel 4 are increased.

As will be described below, at a time point T3 after the time point T1, the anti-lock braking operation for the rear wheel 4 is initiated. Here, in the slide control mode, prior to the initiation of the anti-lock braking operation for the rear wheel 4, the control section 62 may change a positive slope of the braking force L6 of the rear wheel 4 according to behavior information of the lean vehicle 100. The behavior information is information on the behavior of the lean vehicle 100 and includes various parameters possibly influencing the behavior of the lean vehicle 100 making the slide travel. For example, the behavior information can include the slide angle L5, the slip degree L4 of the rear wheel 4, the lean angle of the lean vehicle 100, the lateral acceleration of the lean vehicle 100, the yaw rate of the lean vehicle 100, the pitch angle of the lean vehicle 100, the deceleration of the lean vehicle 100, change rate of each thereof, or the like.

For example, in the example illustrated in FIG. 7, in a period from the time point T1 to the time point T3, the control section 62 changes the positive slope of the braking force L6 of the rear wheel 4 according to at least one of the slip degree L4 of the rear wheel 4 and the slide angle L5 thereof. More specifically, the control section 62 changes the positive slope of the braking force L6 of the rear wheel 4 according to at least one of the slip degree L4 of the rear wheel 4 and the slide angle L5 thereof such that the positive slope is more gradual than the positive slope of a case that only depends on the brake operation amount by the rider. For example, the control section 62 opens/closes the inlet valve 31 of the rear-wheel brake mechanism 14 through the duty control, the pulse control, the combination thereof, or the like, so as to be able to control the positive slope of the braking force L6 of the rear wheel 4 to the desired slope. In the example illustrated in FIG. 7, in the period from the time point T1 to the time point T3, as a result of controlling the positive slope of the braking force L6, the positive slope of the braking force L6 at the time point T2 onward is more gradual than that prior to the time point T2.

For example, the control section 62 reduces the positive slope of the braking force L6 of the rear wheel 4 as the slip degree L4 is increased. Here, the slip degree L4 is increased along with the increase in the braking force L6 of the rear wheel 4. Accordingly, as the slip degree L4 is increased, an increase rate of the braking force L6 of the rear wheel 4 can be reduced, and an increase rate of the slip degree L4 can be reduced (that is, the slip degree L4 can be increased gradually). Thus, it is possible to appropriately suppress the behavior of the lean vehicle 100 from becoming unstable due to the excessive increase in the slip degree L4. In the case where the slip degree L4 is smaller than a specified value, the control section 62 may set the positive slope of the braking force L6 to the positive slope that only depends on the brake operation amount by the rider.

For example, the control section 62 reduces the positive slope of the braking force L6 of the rear wheel 4 as the slide angle L5 is increased. Here, the slide angle L5 tends to be enlarged (increased) along with the increase in the braking force L6 of the rear wheel 4. Accordingly, as the slide angle L5 is increased, the increase rate of the braking force L6 of the rear wheel 4 can be reduced, and an increase rate of the slide angle L5 can be reduced (that is, the slide angle L5 can be increased gradually). Thus, it is possible to appropriately suppress the behavior of the lean vehicle 100 from becoming unstable due to the excessive increase in the slide angle L5. Meanwhile, as the slide angle L5 is reduced, the increase rate of the braking force L6 of the rear wheel 4 can be increased. Thus, it is possible to promptly enlarge (increase) the slide angle L5 and to smoothen the slide travel. In the case where the slide angle L5 is smaller than a specified value, the control section 62 may set the positive slope of the braking force L6 to the positive slope that only depends on the brake operation amount by the rider.

In particular, in the example illustrated in FIG. 7, as will be described below, when reducing the slip degree L4 of the rear wheel 4 in the anti-lock braking operation for the rear wheel 4, which is performed in the slide control mode, the control section 62 reduces the braking force L6 of the rear wheel 4 in a stepwise manner. Thus, compared to a case where the braking force L6 of the rear wheel 4 is significantly reduced once, the slip degree L4 and the slide angle L5 are gradually reduced (recovered). As a result, there is high necessity of suppressing the excessive increase in the slip degree L4 and the excessive increase in the slide angle L5 prior to the initiation of the anti-lock braking operation for the rear wheel 4.

In the control for the positive slope of the braking force L6 of the rear wheel 4, in the case where the positive slope is changed by using both of the slip degree L4 and the slide angle L5, for example, the control section 62 may select, as a control target, larger one of the positive slope that is determined on the basis of the slip degree L4 and the positive slope that is determined on the basis of the slide angle L5, or may select smaller one thereof. Alternatively, the control section 62 may adopt, as the control target, an average value of the positive slope that is determined on the basis of the slip degree L4 and the positive slope that is determined on the basis of the slide angle L5, for example.

Of the behavior information, each of the slip degree L4 and the slide angle L5 is the parameter that has the significant impact on the behavior of the lean vehicle 100 making the slide travel. Thus, in the control for the positive slope of the braking force L6 of the rear wheel 4, which is based on the behavior information prior to the initiation of the anti-lock braking operation for the rear wheel 4, as described above, the slip degree L4 and the slide angle L5 are preferably used as the behavior information. However, the behavior information used in the above control is not particularly limited to the above example. For example, as described above, plural types of the behavior information may be used, or the single type of the behavior information may be used. In addition, any of various combinations can be adopted as the combination of the behavior information. Furthermore, in the control for the positive slope of the braking force L6 of the rear wheel 4, which is based on the behavior information prior to the initiation of the anti-lock braking operation for the rear wheel 4, the lean angle may be used. In such a case, the lateral acceleration or the yaw rate may be used instead of the lean angle.

In the example illustrated in FIG. 7, at the time point T3 after the time point T2, the slip degree L4 of the rear wheel 4 exceeds the upper limit value L2 of the slip degree target. For this reason, at the time point T3, the control section 62 initiates the anti-lock braking operation for the rear wheel 4. Then, at the time point T3 onward, the control section 62 reduces the slip degree L4 of the rear wheel 4 by reducing the braking force L6 of the rear wheel 4. When determining that the slip degree L4 is sufficiently reduced (recovered), the control section 62 terminates the control for reducing the braking force L6 and keeps the braking force L6.

Here, at the time point T3 onward, when reducing the slip degree L4 of the rear wheel 4 in the anti-lock braking operation for the rear wheel 4, which is performed in the slide control mode, the control section 62 reduces the braking force L6 of the rear wheel 4 in the stepwise manner. In the example illustrated in FIG. 7, the braking force L6 is reduced for the first time at the time point T3. Then, after a lapse of a time interval ΔT, the braking force L6 is reduced for the second time. Thereafter, after the lapse of the time interval ΔT, the braking force L6 is reduced for the third time. A reduction amount of the braking force L6 for once at the time of reducing the braking force L6 is set to such an amount that, in reducing operation of the braking force L6 once, the slip degree L4 is not reduced from the upper limit value L2 of the slip degree target to the lower limit value L3 thereof.

As described above, the slip degree L4 can gradually be reduced (recovered) by reducing the braking force L6 of the rear wheel 4 in the stepwise manner. Thus, the slide angle L5 can gradually be reduced (recovered). Meanwhile, in the case where the braking force L6 of the rear wheel 4 is significantly reduced once, as indicated by a two-dot chain line L7 in FIG. 7, the slip degree L4 is rapidly reduced (recovered). Consequently, as indicated by a two-dot chain line L8 in FIG. 7, the slide angle L5 is also rapidly reduced (recovered). For this reason, by reducing the braking force L6 of the rear wheel 4 in the stepwise manner, it is possible to suppress the rapid reduction (recovery) in the slip degree L4 and the slide angle L5. Therefore, it is possible to further appropriately make the slide travel as intended by the rider.

In the example illustrated in FIG. 7, at a time point T4 after the time point T3, the slip degree L4 of the rear wheel 4 falls below the lower limit value L3 of the slip degree target. For this reason, at the time point T4 onward, the control section 62 increases the slip degree L4 of the rear wheel 4 by increasing the braking force L6 of the rear wheel 4. Thereafter, at a time point T5, the slip degree L4 of the rear wheel 4 exceeds the upper limit value L2 of the slip degree target again. Accordingly, at the time point T5 onward, the control section 62 executes the control for reducing the braking force L6 of the rear wheel 4 again. Just as described, in the anti-lock braking operation for the rear wheel 4, the braking force L6 of the rear wheel 4 is repeatedly increased/reduced, and the slip degree L4 of the rear wheel 4 is thereby controlled to the slip degree target. Here, as described above, in the anti-lock braking operation for the rear wheel 4, when the slip degree L4 of the rear wheel 4 is between the upper limit value L2 and the lower limit value L3 of the slip degree target (that is, between the pressure-reduction initiation threshold and the pressure-boosting initiation threshold), the control section 62 may keep the slip degree L4 of the rear wheel 4.

The description has been made above on the example in which the anti-lock braking operation for suppressing locking of the rear wheel 4 is performed by increasing/reducing the braking force of the rear wheel 4. However, the control section 62 may perform the anti-lock braking operation for suppressing locking of the rear wheel 4 by increasing/reducing the drive power of the rear wheel 4.

In the anti-lock braking operation for suppressing locking of the rear wheel 4 by increasing/reducing the drive power of the rear wheel 4, the control section 62 can control the drive power of the rear wheel 4 as the drive wheel by controlling operation of the engine 70, for example. For example, the control section 62 can output the drive power in a direction of decelerating the lean vehicle 100 from the engine 70 (that is, can generate engine braking) by stopping ignition in the engine 70 or stopping supply of the fuel into the cylinders. Just as described, by adjusting ignition timing or a fuel supply amount in or to the engine 70, the control section 62 can output the drive power in both of the direction of decelerating the lean vehicle 100 and a direction of accelerating the lean vehicle 100 from the engine 70. Therefore, the control section 62 can control the slip degree of the rear wheel 4 to the slip degree target by increasing/reducing the drive power of the rear wheel 4.

In the anti-lock braking operation for suppressing locking of the rear wheel 4 by increasing/reducing the drive power of the rear wheel 4, the control section 62 repeatedly executes the control for reducing the slip degree of the rear wheel 4 by increasing the drive power of the rear wheel 4 and the control for increasing the slip degree of the rear wheel 4 by reducing the drive power of the rear wheel 4 (for example, generating the engine braking). In this way, the slip degree of the rear wheel 4 is controlled to the slip degree target. When performing the anti-lock braking operation for increasing/reducing the drive power of the rear wheel 4 on the basis of the presence or the absence of the slide request, the control section 62 can execute processing in which the braking force of the rear wheel 4 in each of the processing in the above-described anti-lock braking operation for increasing/reducing the braking force of the rear wheel 4 is replaced with the drive power of the rear wheel 4.

The control section 62 may execute processing other than the above-described processing. For example, the control section 62 may change at least one of a control amount related to the braking force or the drive power of the rear wheel 4 and the slip degree target of the rear wheel 4 according to state information of the lean vehicle 100. The state information is information on the state of the lean vehicle 100 and can include, for example, the vehicle speed of the lean vehicle 100, the deceleration of the lean vehicle 100, a speed of the engine 70, information on an engaged state of a clutch in the lean vehicle 100, information on a gear stage of the lean vehicle 100, the brake operation amount of the lean vehicle 100, the slip degree of the wheel, the lean angle of the lean vehicle 100, the slide angle of the lean vehicle 100, information on a friction coefficient of the road surface, and the like. In addition, the control amount related to the braking force or the drive power of the rear wheel 4 can include a change amount, a grade change, or the like of the braking force or the drive power of the rear wheel 4, for example.

Effects of Controller

A description will be made on effects of the controller 60 according to the embodiment of the present invention.

In the controller 60, the control section 62 can execute the anti-lock braking operation for suppressing locking of the rear wheel 4 by increasing/reducing the braking force or the drive power of the rear wheel 4 of the lean vehicle 100 and thereby controlling the slip degree of the rear wheel 4 to the slip degree target. In addition, in the case where the slide request, which is the request by the rider to make the lean vehicle 100 slide, is present, the control section 62 implements the slide control mode, in which the anti-lock braking operation for the rear wheel 4 is performed by setting the slip degree target to be higher than that of the case where the slide request is absent. As a result, it is possible to suppress the lateral grip force F2 of the tire of the rear wheel 4 from being excessively increased by the anti-lock braking operation during the slide travel. Thus, it is possible to make the slide travel as intended by the rider. Therefore, it is possible to simultaneously achieve the freedom of driving and the safety of the lean vehicle 100.

Preferably, in the controller 60, when reducing the slip degree of the rear wheel 4 in the anti-lock braking operation for the rear wheel 4, which is performed in the slide control mode, the control section 62 reduces the braking force or the drive power in the stepwise manner. In this way, it is possible to suppress the rapid reduction (recovery) in the slip degree and the slide angle of the rear wheel 4. Therefore, it is possible to further appropriately make the slide travel as intended by the rider.

Preferably, in the controller 60, in the slide control mode, prior to the initiation of the anti-lock braking operation for the rear wheel 4, the control section 62 changes the positive slope of the braking force or the drive power of the rear wheel 4 according to the behavior information of the lean vehicle 100. In this way, for example, it is possible to change the increase rates of the slip degree and the slide angle of the rear wheel 4 according to the behavior of the lean vehicle 100. Therefore, it is possible to suppress the behavior of the lean vehicle 100 from becoming unstable. In particular, in the case where the slip degree of the rear wheel 4 is reduced in the anti-lock braking operation, which is performed in the slide control mode, and the braking force or the drive power is reduced in the stepwise manner, the slip degree and the slide angle of the rear wheel 4 are gradually reduced (recovered). For this reason, the above control for the positive slope is effective.

Preferably, in the controller 60, the slip degree target of the rear wheel 4 is the numerical range having the upper limit value and the lower limit value, and the control section 62 changes the difference between the upper limit value and the lower limit value between the time when the slide control mode is implemented and the time when the slide control mode is not implemented. As a result, it is possible to optimize the frequency of the repeated increase/reduction in the braking force of the rear wheel 4 in the anti-lock braking operation for the rear wheel 4, which is performed in the slide control mode.

Preferably, in the controller 60, the control section 62 determines the presence or the absence of the slide request on the basis of the driving operation information of the rider. In this way, it is possible to automatically determine the presence or the absence of the slide request without relying on the operation by the rider. Therefore, it is possible to automatically implement the slide control mode.

Preferably, in the controller 60, the control section 62 determines the presence or the absence of the slide request on the basis of the setting information by the rider. In this way, it is possible to appropriately determine the presence or the absence of the slide request according to the intention of the rider. Therefore, it is possible to appropriately implement the slide control mode according to the intention of the rider.

Preferably, in the controller 60, the control section 62 may change at least one of the control amount related to the braking force or the drive power of the rear wheel 4 and the slip degree target of the rear wheel 4 according to the state information of the lean vehicle 100. In this way, in the anti-lock braking operation for the rear wheel 4, it is possible to further appropriately control the slip degree of the rear wheel 4 according to the state of the lean vehicle 100. Therefore, it is possible to further appropriately and simultaneously achieve the freedom of driving and the safety of the lean vehicle 100.

The present invention is not limited to the embodiment that has been described. For example, only a part of the embodiment may be implemented.

REFERENCE SIGNS LIST

1: Trunk
2: Handlebar
3: Front wheel
3*a*: Rotor
4: Rear wheel
4*a*: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Front-wheel rotational frequency sensor
42: Rear-wheel rotational frequency sensor
43: Inertial measurement unit
50: Hydraulic pressure control unit
51: Base body
60: Controller
61: Acquisition section
62: Control section
62*a*: Determination section
62*b*: Brake control section
70: Engine
100: Lean vehicle

The invention claimed is:

1. A controller (60) that controls behavior of a lean vehicle (100), the controller comprising:
   a control section (62) configured to perform an anti-lock braking operation for suppressing locking of a rear wheel (4) by increasing/reducing a braking force or drive power of the rear wheel (4) of the lean vehicle (100) and thereby controlling a slip degree of the rear wheel (4) to a slip degree target, wherein
   in the case where a slide request, which is a request by a rider to make the lean vehicle (100) slide, is present, the control section (62) implements a slide control mode in which the anti-lock braking operation is performed by setting the slip degree target to be higher than that of a case where the slide request is absent.

2. The controller according to claim 1, wherein
when reducing the slip degree in the anti-lock braking operation, which is performed in the slide control mode, the control section (62) reduces the braking force or the drive power in a stepwise manner.

3. The controller according to claim 1, wherein
in the slide control mode, prior to initiation of the anti-lock braking operation, the control section (62) reduces a positive slope of the braking force according to behavior information of the lean vehicle (100).

4. The controller according to claim 1, wherein
the slip degree target is a numerical range having an upper limit value and a lower limit value, and
the control section (62) changes a difference between the upper limit value and the lower limit value between time when the slide control mode is implemented and time when the slide control mode is not implemented.

5. The controller according to claim 1, wherein
the control section (62) determines the presence or the absence of the slide request on the basis of driving operation information of the rider.

6. The controller according to claim 1, wherein
the control section (62) determines the presence or the absence of the slide request on the basis of setting information by the rider.

7. The controller according to claim 1, wherein
the control section (62) changes at least one of a control amount related to the braking force or the drive power and the slip degree target according to state information of the lean vehicle (100).

8. A control method for behavior of a lean vehicle (100), the method comprising:
performing an anti-lock braking operation for suppressing locking of a rear wheel (4) by increasing/reducing a braking force or drive power of the rear wheel (4) of the lean vehicle (100) and thereby controlling a slip degree of the rear wheel (4) to a slip degree target, and
when a slide request, which is a request by a rider to make the lean vehicle (100) slide, is present, implementing a slide control mode in which the anti-lock braking operation is performed by setting the slip degree target to be higher than that of a case where the slide request is absent.

9. The controller according to claim 1, wherein
in the slide control mode, prior to initiation of the anti-lock braking operation, the control section (62) changes the drive power according to behavior information of the lean vehicle (100).

\* \* \* \* \*